United States Patent [19]

Mitchell

[11] 4,095,815
[45] Jun. 20, 1978

[54] RACING SULKY

[76] Inventor: Stanley W. Mitchell, 1180 Center St. R.R.#1, Windsor, Ontario, Canada

[21] Appl. No.: 756,362

[22] Filed: Jan. 3, 1977

[51] Int. Cl.² ............................................. B62C 1/08
[52] U.S. Cl. .................................................... 280/63
[58] Field of Search .................... 280/63, 66, 74, 77, 280/64

[56] References Cited

U.S. PATENT DOCUMENTS

| 518,462 | 4/1894 | Loomis | 280/63 |
|---|---|---|---|
| 1,214,758 | 2/1917 | Coates | 280/63 |
| 3,388,921 | 6/1968 | Pickard | 280/63 |
| 3,415,533 | 12/1968 | Bliss, Jr. | 280/63 X |
| 3,482,851 | 12/1969 | Pickard | 280/63 |
| 4,033,598 | 7/1977 | King | 280/63 |

*Primary Examiner*—Bruce H. Stoner, Jr.
*Assistant Examiner*—Michael J. Forman

[57] ABSTRACT

A light-weight tubular steel racing sulky is described which is easily assembled or dis-assembled for shipping or storage and which is easily adjustable for increasing or decreasing the load on the shafts. The racing sulky includes a horizontal crossbeam member having a pair of shafts fixed thereto and extending forwardly for support by a horse. A seat is fixed to the crossbeam rearwardly thereof and a pair of support leg assemblies are pivotally joined to the ends of the crossbeam and carry wheels at their lower extremities. A pair of adjustable struts connect the lower extremities of the support legs to the shafts at points forward of the wheels and specially designed corner brace assemblies are angularly, swingably connected between the crossbeam and the legs.

5 Claims, 8 Drawing Figures

}

RACING SULKY

BACKGROUND OF THE INVENTION

1. Field of the Invention

This invention relates to racing sulkies or bikes for use in harness racing of horses.

2. Description of the Prior Art

Light-weight racing sulkies have been around for a very long time and have traditionally been constructed with shafts made of wood which have been steamed and formed into a desired shape. In recent times there have been some moves away from the use of wood and one example of this is described in Pickard, U.S. Pat. No. 3,388,921. In that case laminations were used made partly from wood and partly from metal.

It has also been long known to make racing sulkies adjustable for increasing or decreasing the load on the shafts. One proposed system for achieving this is described in Pickard, U.S. Pat. No. 3,482,851. In that case the adjustability was achieved by the use of two articulated parts including an inverted U-shaped frame portion supporting the wheels and hingedly connected to a shaft assembly.

Very recently there has been a great interest in the construction of all-steel racing sulkies and the present invention represents a departure from the usual design of racing sulkies which takes maximum advantage of an all-steel construction.

SUMMARY OF THE INVENTION

According to this invention, a racing sulky is provided which includes a horizontal crossbeam member with a pair of laterally spaced shafts fixed to the crossbeam and extending forwardly for support by a horse. A seat is fixed to the crossbeam rearwardly thereof and a pair of support leg assemblies are pivotally joined to the ends of the crossbeam and carry wheels at their lower extremities. A pair of struts connect the lower extremities of the support legs to the shafts at points forward of the wheels and these struts are adjustable whereby the center of gravity of the sulky with the driver mounted on the seat is adjustable.

In order to provide sufficient strength and rigidity between the crossbeam and the support legs, corner brace assemblies are angularly, swingably connected between the crossbeam and the leg supports. Each corner brace assembly includes an elongated plate member and a rod member with each of these members including a bent end portions with the ends of the rod member being threaded. These threaded rod ends pass through holes in the bent end portions of the plate members and through holes in the brackets fixed to the crossbeam and legs. The brackets and plates are held together between threaded fasteners on the threaded portions of the rods.

According to preferred features, these shafts are detachably mounted on the crossbeam and the support legs are detachably mounted on the ends of the crossbeam. Thus, the entire assembly can be easily dismantled and reassembled for storage, shipping, etc. This also facilitates the replacement of broken parts.

For a better understanding of the nature and objects of the invention, reference may be had to the following description of certain preferred embodiments, taken in conjunction with the accompanying drawings, in which.

Figure 6:
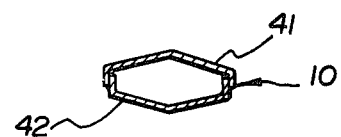
FIG. 6 is an enlarged cross-sectional view of a crossbeam.

Referring to the drawings, the racing sulky shown herein comprises a crossbeam 10 of generally rectangular configuration and formed into a tubular structure from sheet steel. For additional strength, it is preferably in the form of an upper portion 41 and a lower portion 42 joined at the side edges by welding, with the top and bottom faces crowned as shown in FIG. 6. Thus, in cross-section it has a generally truncated diamond shape. Pivotally mounted onto the ends of crossbeam 10 are a pair of support legs 11. These support legs are formed in substantially the same manner as the crossbeam 10.

At the upper end of leg 11 on the inner face thereof is fixed a bearing plate 12 and this engages a second bearing plate mounted in the end of crossbeam 10. A hole is provided laterally through the upper end of support leg 11 and a threaded member is provided within the end of crossbeam 10 so that leg 11 can be mounted onto the end of crossbeam 10 by means of bolt 13. Extending angularly between the support leg 11 and the crossbeam 10 is a corner brace assembly 14 which will be discussed in greater detail hereinafter.

A pair of wheels 15 rotatably mounted on axles 16 are carried by the support legs 11. In order to provide support for both ends of the axle, an inverted L-shaped steel member 17 is welded at its upper end to an upper portion of support leg 11. The axle 16 is then mounted across between the lower extremities of the support leg 11 and the support member 17.

A moulded plastic seat 18 is mounted on a U-shaped square, tubular support bar 19. This bar is welded to crossbeam 10 and the seat 18 is adjustably mounted thereon.

Figure 4:
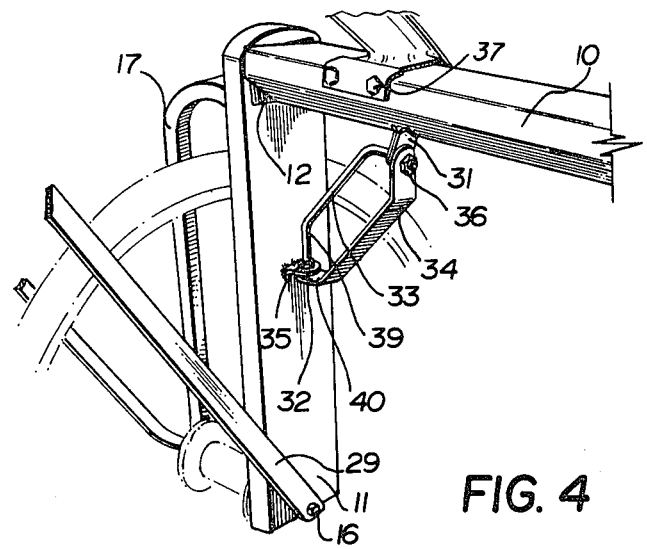
FIG. 4 is an enlarged perspective view of the crossbeam and support leg assemblies.
Figure 5:
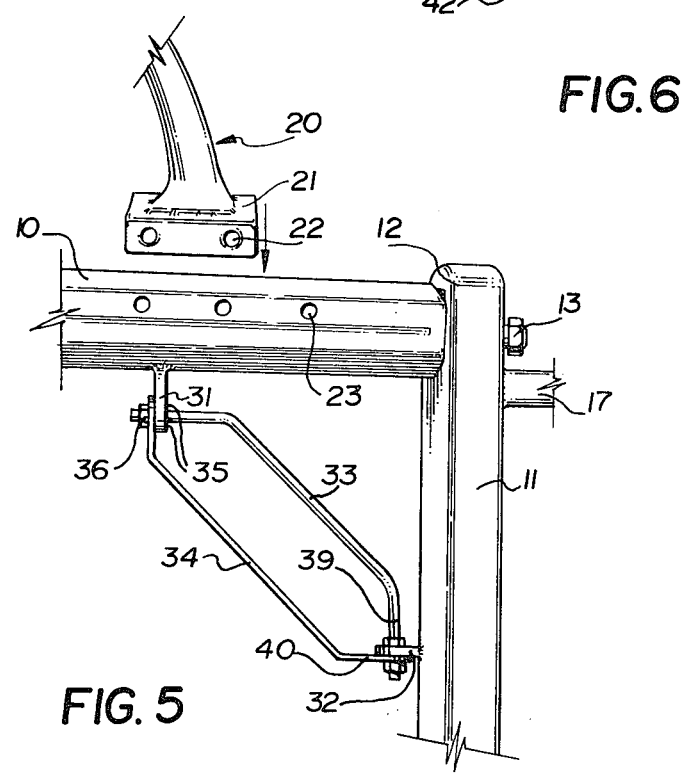
FIG. 5 is an enlarged view, in rear elevation, of the portion of the assembly shown in FIG. 4.

Each shaft 20 is formed from tubular steel and is mounted to the crossbeam 10 by means of an inverted U-shaped end bracket 21. Holes 22 are provided in the legs of the bracket which mate with holes 23 in the edge faces of crossbeam 10. These are fixed in position by means of bolts 37 and as will be seen, particularly from FIGS. 4 and 5, additional holes 23 can be provided in the crossbeam so that the lateral spacing of the shafts 20 can be varied to accommodate horses of different sizes.

The forward portions of the shafts include outwardly bowed main portions 24 which are connected to a pair of forward thimble portions 25. In a central region of the outwardly bowed portion 24 is mounted a downwardly extending bracket 26 having a series of longitudinally spaced holes extending therethrough. Between these braces 26 and wheel axle 16 are mounted struts 27. Each strut 27 is bifurcated with an outer strut portion 28 and an inner strut portion 29 between which is located the wheel. The free extremities of struts 28 and 29 are mounted on axle 16 while the front extremity of the strut assembly 27 is fixed by means of a bolt 38 through a hole in the bracket 26. Stirrups 30 are adjustably mounted on the shafts by means of clamp members which wrap around the shafts.

Figure 1:
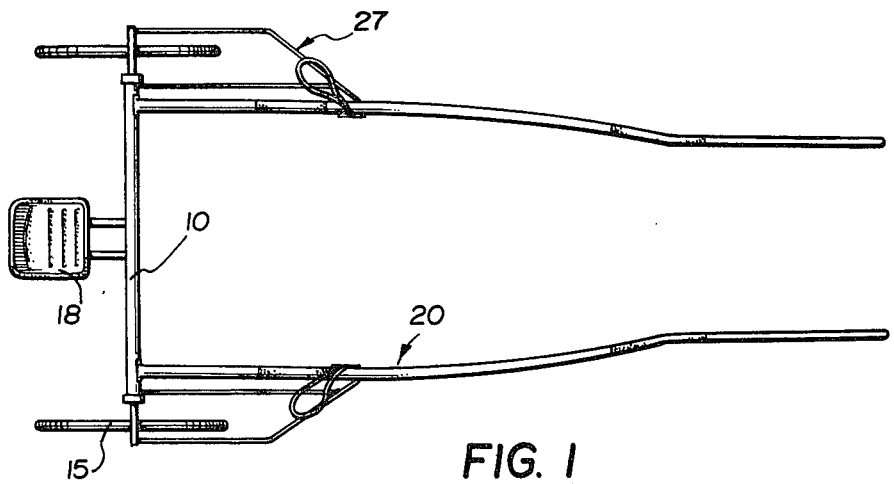
FIG. 1 is a view, in plan of a racing sulky embodying the principle features of the invention.
Figure 2:
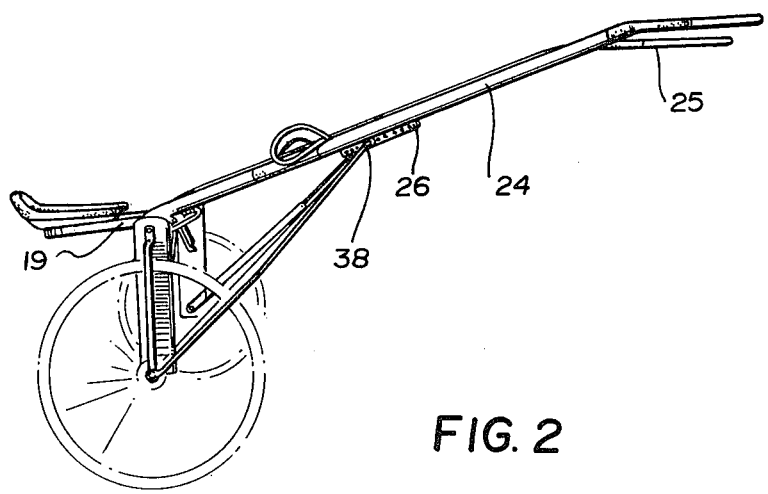
FIG. 2 is a view in side elevation, of the sulky shown in FIG. 1.
Figure 3:
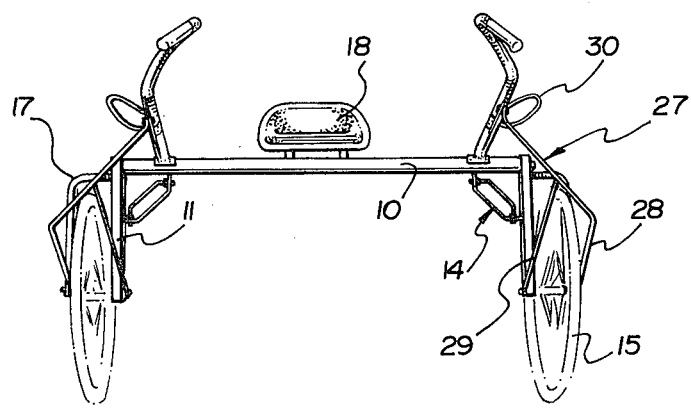
FIG. 3 is a view, in front elevation, of the sulky.
Figure 7:
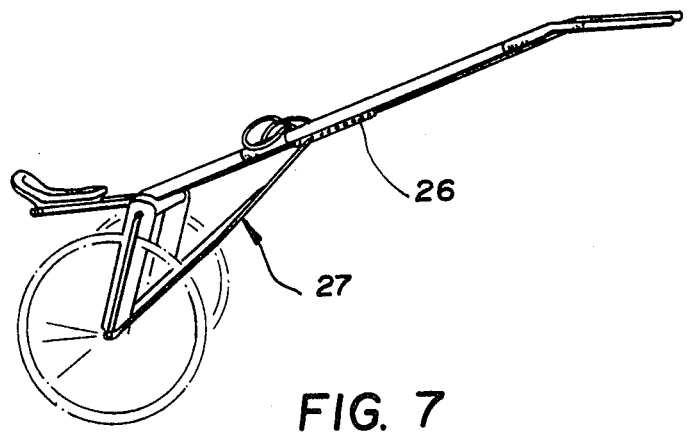
FIG. 7 is a side elevation showing the support legs in the maximum rear position.
Figure 8:
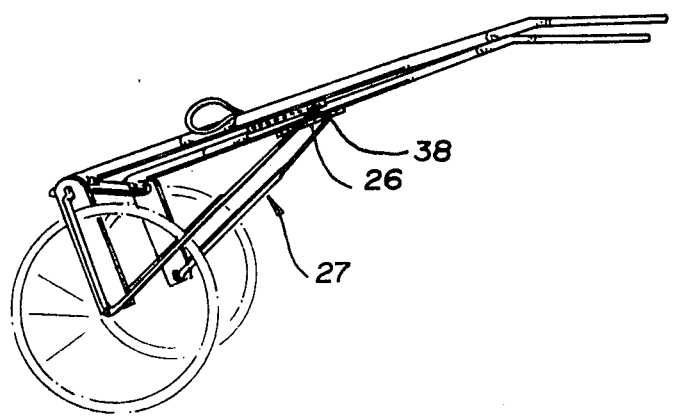
FIG. 8 is a side elevation showing the support legs in the maximum forward position.

FIG. 2 of the drawings shows the ends of the struts 27 mounted in holes in a central region of the brackets 26 while FIGS. 7 and 8 show what occurs when the mounting position of the struts is varied. FIG. 2 would be the normal position used providing a normal lift on the shafts for a sound horse. With the wheels in the position shown in FIG. 7, it will be seen that the load has been thrown forwardly and this position is advantageous for a horse with sound front legs but sore or bowed rear tendons. FIG. 8 shows the position where there is a maximum lift on the front end of the shafts and is used for horses with sore front legs.

While the above system has obvious advantages in terms of adjustability and ease of dismantling and assembly, a problem area is to provide adequate rigidity and stability between the support legs and the crossbeam while still allowing adequate swinging movement between the legs and the crossbeam. This problem has been overcome by means of the corner bracket assembly 14. This assembly includes a bracket member 31 fixed to the lower face of crossbeam 10 and bracket 32 fixed to an inner face of support leg 11. Each bracket has a hole extending therethrough and passing through the holes are the ends of a rod 33 having bent end portions 39 whereby the end portions are at 90° to each other. These end portions 39 are threaded for receiving nuts. The next essential portion of the bracket is a plate member 34 having end portions 40 bent at 90° to each other. These end portions 40 have holes extending therethrough, through which pass the ends of rod 33. The brackets 31 and 32 and the end portions 40 of plates 34 are then clamped between an inner nut 35 and an outer nut 36.

Usually these nuts can be pulled up quite snug without being excessively tight so that the support legs 11 can be swung through an arc of about 20° with respect to the crossbeam 10 without any necessity of loosening the nuts before the adjustments are made. All that need be done is to remove the bolts 38 connecting the outer ends of struts 27 to bracket 26, then swinging the legs 11 to the desired position and reinserting the bolts 38.

Some compensation during this swing, which is approximately 10° in each side of the center point, can be provided by making the holes in the end portions 40 of the plate 34 slightly larger than the diameter of the rod 33. This rod 33 also serves the additional purpose of providing some adjustment for correction of toe-in or toe-out of the wheels.

It will be seen, therefore, that this rather simple bracket assembly 14 provides at the one time a strong and rigid connection between crossbeam 10 and support leg 11 and a compensating means which permits angular adjustment between crossbeam 10 and leg 11 without the necessity of any complicated compensating equipment.

Since numerous changes may be made in the above described construction, and different embodiments of the invention may be made without departing from the spirit and scope thereof, it is intended that all the matter contained in the forgoing description are shown in the accompanying drawings shall be interpreted as illustrative and not in a limiting sense.

I claim as my invention:

1. A racing sulky comprising a horizontal crossbeam member, a pair of laterally spaced shafts fixed to said crossbeam and extending forwardly for support by a horse, a seat fixed to said crossbeam rearwardly thereof, a pair of support leg assemblies pivotally joined to the ends of said crossbeam and carrying wheels at their lower extremities, a pair of struts connecting said lower extremities of said support legs to said shafts at points forward of said wheels, said struts being adjustable whereby the center of gravity of the sulky with the driver mounted on the seat is adjustable and corner brace assemblies angularly, swingably connected between said crossbeam and said support legs, each said corner brace assembly including an elongated plate member and a rod member, each said plate member including bent end portions with a hole provided through each end portion and the ends of each said rod member being threaded, said threaded portions passing through said holes in the bent end portions of said plate member and through holes provided in brackets fixed to said crossbeam and legs, with the bracket and plate being held together between threaded fasteners on said threaded portions.

2. The racing sulky according to claim 1, wherein each support leg assembly includes a main inner leg member pivotally joined to said crossbeam and an inverted L-shaped outer leg member fixed to said inner leg member in an upper region thereof, with the wheel being mounted for rotation between the lower extremities of said inner and outer leg members.

3. The racing sulky according to claim 2, wherein said struts are bifurcated.

4. The racing sulky according to claim 3, wherein a series of connecting points for said struts are provided along each shaft, whereby the struts are adjustable.

5. The racing sulky according to claim 4, wherein said connecting points comprise an elongated bracket projecting from the bottom of each shaft with a series of longitudinally spaced holes extending therethrough.

* * * * *